United States Patent
Zhang et al.

(10) Patent No.: US 11,879,608 B2
(45) Date of Patent: Jan. 23, 2024

(54) AUTOMOTIVE LAMP OPTICAL ELEMENT, AUTOMOTIVE LAMP MODULE, AND VEHICLE

(71) Applicant: HASCO VISION TECHNOLOGY CO., LTD., Shanghai (CN)

(72) Inventors: Dapan Zhang, Shanghai (CN); Zhiping Qiu, Shanghai (CN); He Zhu, Shanghai (CN); Wenhui Sang, Shanghai (CN); Rui Nie, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 55 days.

(21) Appl. No.: 17/596,008

(22) PCT Filed: Jan. 8, 2020

(86) PCT No.: PCT/CN2020/070867
§ 371 (c)(1),
(2) Date: Dec. 1, 2021

(87) PCT Pub. No.: WO2020/244228
PCT Pub. Date: Dec. 10, 2020

(65) Prior Publication Data
US 2022/0316677 A1 Oct. 6, 2022

(30) Foreign Application Priority Data

Jun. 5, 2019 (CN) .......................... 201910488336.X
Jun. 5, 2019 (CN) .......................... 201920859938.7
Aug. 8, 2019 (CN) .......................... 201910730411.9

(51) Int. Cl.
*F21S 41/19* (2018.01)
*F21S 41/37* (2018.01)
(Continued)

(52) U.S. Cl.
CPC .......... *F21S 41/192* (2018.01); *B60Q 1/0408* (2013.01); *B60Q 1/0686* (2013.01);
(Continued)

(58) Field of Classification Search
CPC .......... F21S 41/143; F21S 41/24; F21S 41/25; F21S 41/26; F21S 41/265; F21S 41/27;
(Continued)

(56) References Cited

U.S. PATENT DOCUMENTS 10,139,068 B2 * 11/2018 Plank .................... F21S 41/143
10,139,646 B2 * 11/2018 Gromfeld ............. F21S 41/365
(Continued)

FOREIGN PATENT DOCUMENTS

CN 101311769 11/2008
CN 102032519 4/2011
(Continued)

OTHER PUBLICATIONS

International Search Report for counterpart Application No. PCT/CN2020/070867 dated Mar. 26, 2020.
(Continued)

*Primary Examiner* — Matthew J. Peerce
(74) *Attorney, Agent, or Firm* — McNees Wallace & Nurick LLC

(57) ABSTRACT

Provided are an automotive lamp optical element, an automotive lamp module and a vehicle. The automotive lamp optical element includes a light-incident portion, a transmission portion and a light-emitting portion connected in sequence. The light-incident portion is provided with at least one light-incident structure configured to converge light. An area of a cross section of the transmission portion gradually increases in a light transmission direction. A light-emitting convex surface is formed on one end of the light-emitting portion facing away from the transmission portion. The
(Continued)

automotive lamp module includes the above automotive lamp optical element, and further includes at least one light source. The at least one light source is disposed in one-to-one correspondence with the at least one light-incident structure.

15 Claims, 3 Drawing Sheets

(51) Int. Cl.

| | | |
|---|---|---|
| *F21S 41/20* | (2018.01) | |
| *F21S 41/43* | (2018.01) | |
| *F21S 41/24* | (2018.01) | |
| *F21S 41/143* | (2018.01) | |
| *F21S 45/47* | (2018.01) | |
| *F21S 41/29* | (2018.01) | |
| *B60Q 1/14* | (2006.01) | |
| *F21S 41/153* | (2018.01) | |
| *B60Q 1/068* | (2006.01) | |
| *B60Q 1/04* | (2006.01) | |
| *F21W 102/20* | (2018.01) | |
| *F21W 107/10* | (2018.01) | |

(52) U.S. Cl.
CPC .......... *B60Q 1/1423* (2013.01); *F21S 41/143* (2018.01); *F21S 41/153* (2018.01); *F21S 41/20* (2018.01); *F21S 41/24* (2018.01); *F21S 41/295* (2018.01); *F21S 41/37* (2018.01); *F21S 41/43* (2018.01); *F21S 45/47* (2018.01); *F21W 2102/20* (2018.01); *F21W 2107/10* (2018.01)

(58) Field of Classification Search
CPC .......... F21S 41/275; F21S 41/30; F21S 41/32; F21S 41/321; F21S 41/322; F21S 41/323
See application file for complete search history.

(56) References Cited

U.S. PATENT DOCUMENTS

| | | | | |
|---|---|---|---|---|
| 10,203,081 | B2* | 2/2019 | Matsuda | F21S 41/143 |
| 10,563,832 | B2* | 2/2020 | Zhu | F21S 41/141 |
| 2004/0156209 | A1 | 8/2004 | Ishida | |
| 2014/0133168 | A1* | 5/2014 | Fiederling | F21S 41/24 |
| | | | | 362/235 |
| 2014/0204602 | A1* | 7/2014 | Jungwirth | F21S 41/143 |
| | | | | 362/521 |
| 2015/0167913 | A1* | 6/2015 | Stefanov | F21S 41/663 |
| | | | | 362/511 |
| 2016/0368414 | A1* | 12/2016 | Son | F21S 41/663 |

FOREIGN PATENT DOCUMENTS

| | | |
|---|---|---|
| CN | 103090286 | 5/2013 |
| CN | 104704288 | 6/2015 |
| CN | 105358900 | 2/2016 |
| CN | 107489955 | 12/2017 |
| CN | 207527498 | 6/2018 |
| CN | 208107967 | 11/2018 |
| CN | 208871529 | 5/2019 |
| DE | 102013013995 A1 | 7/2014 |
| DE | 102016006605 A1 | 4/2017 |
| EP | 2306075 A2 | 4/2011 |
| EP | 2340984 A1 | 7/2011 |
| EP | 3150905 A1 | 4/2017 |
| FR | 3050010 A1 | 10/2017 |
| JP | 2013037963 A | 2/2013 |
| JP | 2015524986 A | 8/2015 |
| JP | 2015176745 A | 10/2015 |
| JP | 2016029621 A | 3/2016 |
| JP | 2016096143 A | 5/2016 |
| JP | 2018055907 A | 4/2018 |
| WO | 2014019912 A1 | 2/2014 |
| WO | 2017185118 A1 | 11/2017 |

OTHER PUBLICATIONS

International Search Report for counterpart Application No. PCT/CN2020/070935 dated Mar. 26, 2020.

* cited by examiner

AUTOMOTIVE LAMP OPTICAL ELEMENT, AUTOMOTIVE LAMP MODULE, AND VEHICLE

This application is a national stage application filed under 37 U.S.C. 371 based on International Patent Application No. PCT/CN2020/070867, filed Jan. 8, 2020, which claims priority to Chinese patent applications No. 201910488336.X filed Jun. 5, 2019, Chinese patent application No. 201920859938.7 filed Jun. 5, 2019, and Chinese patent application No. 201910730411.9 filed Aug. 8, 2019, the disclosures of which are incorporated herein by reference in their entireties.

This disclosure claims priority to Chinese patent applications No. 201910488336.X and No. 201920859938.7 filed Jun. 5, 2019 and Chinese patent application No. 201910730411.9 filed Aug. 8, 2019, the disclosures of which are incorporated herein by reference in their entireties.

TECHNICAL FIELD

The present application relates to the technical field of automotive lighting, for example, to an automotive lamp optical element, an automotive lamp module and a vehicle.

BACKGROUND

A automotive lamp module refers to a device or a unit, after being used independently or in combination, capable of achieving one or more lighting functions. Generally, the automotive lamp module with a low beam or a high beam is provided with a primary optical element (e.g., a reflector, a transparent lightguide member) and a secondary optical element (e.g., a lens). The lens or the secondary optical element with equivalent function to lens serves as an optical element, for finally emitting light, of the automotive lamp module.

However, the existing automotive lamp module has disadvantages as follows. The size is relatively large. Since the distance between the primary optical element and the secondary optical element is relatively large, the size of the automotive lamp module is also large, and it is difficult to further reduce the size of the automotive lamp module on the basis of guaranteeing the performance of the automotive lamp module due to the technical needs of cooperating the secondary optical element with the primary optical element for light distribution. The installation is complicated. The position accuracy among various accessories needs to be ensured during the installation, especially, the relative position accuracy between the optical elements. The structure is complicated. In order to position and install the primary optical element and the secondary optical element, corresponding accessories such as a mounting bracket or the like are required. The optical system accuracy is difficult to be ensured. The reasons are that on one hand, the optical system accuracy is affected by the manufacture accuracy of accessories of the primary optical element and the secondary optical element themselves, and on the other hand, the optical system accuracy is affected by the relative position accuracy between the two optical elements and the light source. The dimming is difficult. In dimming, in addition to dimming the entire module relative to the lamp body, it is necessary to adjust a position of a small assembly composed of the primary optical element and the light source relative to the secondary optical element. The manufacturing cost is high.

SUMMARY

Based on the above problems, the present application provides an automotive lamp optical element, an automotive lamp module and a vehicle, which are simple in structure, small in size and easy to install.

The present application provides an automotive lamp optical element. The automotive lamp optical element includes a light-incident portion, a transmission portion and a light-emitting portion connected in sequence. The light-incident portion is provided with at least one light-incident structure configured to converge light. An area of a cross section of the transmission portion gradually increases in a light transmission direction. A light-emitting convex surface is formed on one end of the light-emitting portion facing away from the transmission portion.

Provided is an automotive lamp module, including an automotive optical element as described above, and further includes at least one light source, where the at least one light source is disposed opposite to and in one-to-one correspondence with the at least one light-incident structure.

Provided is a vehicle, including the automotive lamp module as described above.

REFERENCE LIST

1—light-incident portion; 11—light-incident structure; 2—transmission portion; 3—light-emitting portion; 31—light-emitting convex surface; 200—light source.

DETAILED DESCRIPTION

In the description of this application, it is to be noted that, in the case of no explanation to the contrary, the position or position relationship indicated by the orientation words such as "center", "up", "down", "left", "right", "vertical", "horizontal", "inside", "outside", "front" and "rear" is based on the position or position relationship indicated by the direction of a vehicle in a normal driving state after automotive lamp optical element of the present application is installed on the vehicle. Moreover, terms such as "first" and "second" are used only for the purpose of description and are not to be construed as indicating or implying relative importance, and terms "first position" and "second position" are two different positions.

In the description of the present application, it is to be noted that terms such as "mounted", "joined", and "connected" are to be understood in a broad sense unless otherwise expressly specified and limited. For example, the term "connected" may refer to "securely connected" or "detachably connected"; may refer to "mechanically connected" or "electrically connected"; or may refer to "connected directly", "connected indirectly through an intermediary", or "connected in two components". For those of ordinary skill in the art, the specific meanings of the preceding terms in the present application may be understood based on specific situations.

Solutions of the present application will be described in detail in conjunction with drawings and embodiments.

This embodiment provides an automotive lamp optical element, which can be used in a matrix headlamp module. The matrix headlamp module is an automotive lamp module capable of dividing a high beam illumination area into multiple illumination areas, and can shield a target object in front of the vehicle by turning off the corresponding light source so as to avoid dazzling other road users and improve the driving safety performance.

Figure 1:
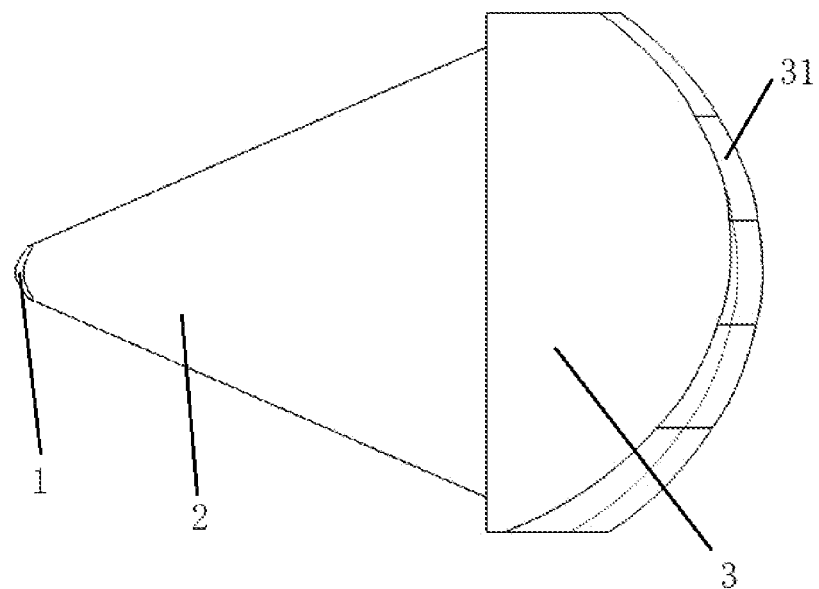
FIG. 1 is a side view of an automotive lamp optical element of an embodiment of the present application.
Figure 2:
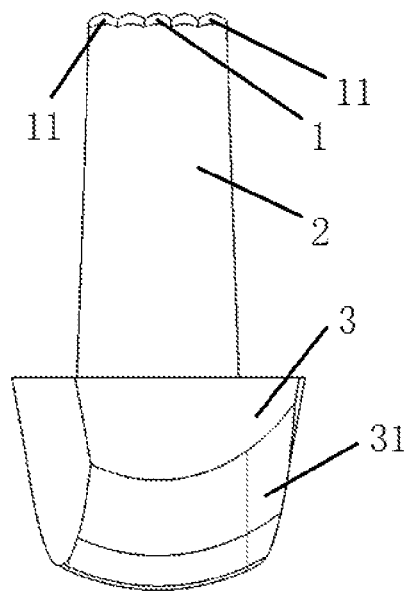
FIG. 2 is a top view of an automotive lamp optical element of an embodiment of the present application.

As shown in FIGS. 1 and 2, the automotive lamp optical element includes a light-incident portion 1, a transmission portion 2 and a light-emitting portion 3 connected in sequence. The light-incident portion 1 is provided with at least one light-incident structure 11 configured to converge light. The area of a cross section of the transmission portion 2 gradually increases in a light transmission direction. A light-emitting convex surface 31 is formed on one end of the light-emitting portion 3 facing away from the transmission portion 2.

An optical axis is an axis extending in a front-rear direction of the automotive lamp optical element and passing through a focal point of the light-emitting portion 3, and the light transmission direction is defined as a direction along the optical axis from the light-incident portion 1 toward the light-emitting portion 3. The cross section is defined as a plane perpendicular to the optical axis.

In this embodiment, for ease of the light-converging, a light-incident convex surface is formed on one end of the light-incident structure 11 facing away from the transmission portion 2. Of course, the light-incident structure 11 may be another converging structure. For example, the light-incident structure 11 is a converging cup. In this embodiment, five light-incident structures 11 are provided and arranged in a row. In other embodiments, multiple light-incident structures 11 are provided as needed, and the multiple light-incident structures 11 may be distributed in rows and columns.

The area of the cross section of the transmission portion 2 gradually increases in a light transmission direction, that is, the area of the cross section of the transmission portion 2 gradually increases from one end of the transmission portion 2 adjacent to the light-incident portion 1 toward one end of the transmission portion 2 adjacent to the light-emitting portion 3.

Figure 3:
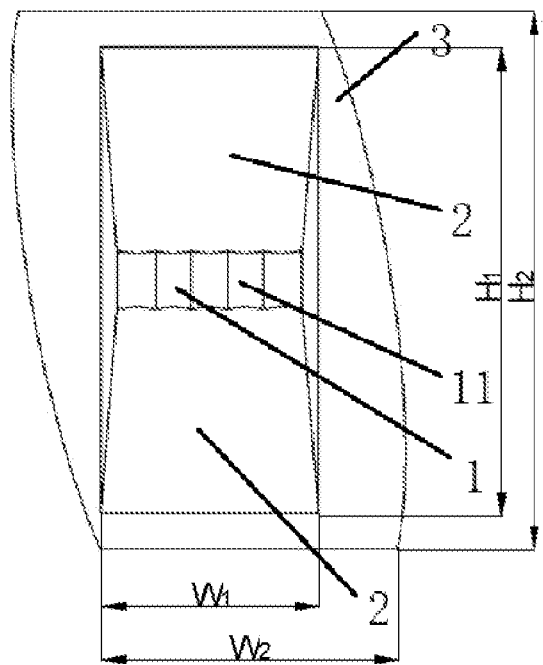
FIG. 3 is a rear view of an automotive lamp optical element of an embodiment of the present application.

Each of four side surfaces of the transmission portion 2 except two end surfaces is a flared trapezoid in the light transmission direction, and every two opposite side surfaces of the four side surfaces have a same shape. In this embodiment, five light-incident structures 11 are provided and arranged in a row. As shown in FIG. 1, two opposite side surfaces of the transmission portion 2 are a flared trapezoid in the light transmission direction. Such structure can collect the light well and can further make the size of the whole automotive lamp optical element as less as possible, avoiding unnecessary structures. As shown in FIG. 2, the other two opposite side surfaces of the transmission portion 2 are a flared trapezoid in the light transmission direction so as to collect the light. As shown in FIG. 3, in this embodiment, the width of the transmission portion 2 is less than the width of the light-emitting portion 3, and the height H1 of the transmission portion 2 is less than the height H2 of the light-emitting portion 3. The width of the transmission portion 2 in a left-right direction is less than the width of the light-emitting portion 3 in the left-right direction so as to prevent part of the light emitted by a light source 200 from being emitted out of a side surface of the light-emitting portion 3. The height of the transmission portion 2 in an up-down direction is less than the height of the light-emitting portion 3 in the up-down direction so that the light emitted by the light source 200 can be refracted out of only the light-emitting convex surface 31 of the light-emitting portion 3.

Incident light emitted by the light source 200 is converged by the light-incident portion 1, transmitted to the light-emitting portion 3 through the transmission portion 2, and refracted out of the light-emitting portion 3. In this process, generally, part of the light is emitted directly out of the side surface of the transmission portion 2 or reflected by the side surface of the transmission portion 2 and then refracted out of the light-emitting portion 3, and thus a large amount of stray light is generated, which will affect the optical performance of the automotive lamp light shape. In the existing art, light is prevented from being emitted out of the side surfaces of the whole optical element by painting the side surfaces of the whole optical element black. However, if the side surfaces of the entire optical element all are painted black, since the light-emitting portion 3 is exposed outside the lamp body, the black paint on the side surfaces of the optical element may affect the permeability and aesthetics of the optical element. In the existing art, a skin pattern may be also arranged on the side surfaces of the optical element to eliminate the stray light, but this method cannot completely avoid the stray light. In this embodiment, the side surfaces of the transmission portion 2 are coated with a light absorbing layer, and the light absorbing layer is, for example, a light absorbing black paint, so as to prevent the light from being emitted out of the side surfaces of the transmission portion 2. Moreover, since the side surfaces of the light-emitting portion 3 are not coated with the black paint, permeability and aesthetics of the part of the automotive lamp optical element exposed outside are ensured.

Figure 4:
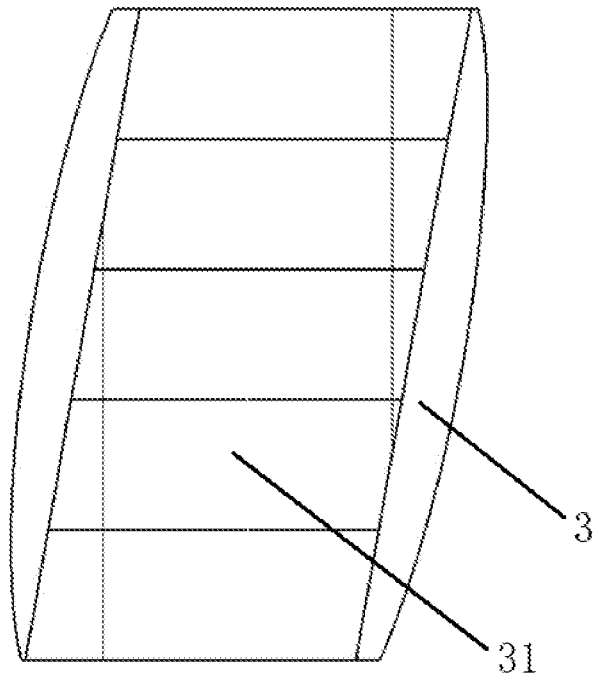
FIG. 4 is a front view of an automotive lamp optical element of an embodiment of the present application.

The light-emitting convex surface 31 of the light-emitting portion 3 protrudes forward, and forms a double convex lens with the light-incident structure 11 for collecting, aligning and then projecting the incident light forward to form a corresponding automotive lamp light shape. As shown in FIGS. 3 and 4, the shape of the cross section of the light-emitting portion 3 perpendicular to the optical axis is a parallelogram when viewed directly in front of the automotive lamp optical element. This shape is only exemplary, and the shape of a lens having the light-emitting convex surface 31 may be configured as a desired shape as required in a case where there is a relatively small influence on the light-emitting convex surface 31. In this embodiment, the area of the cross section of the light-emitting portion 3 may gradually decrease in the light transmission direction from one end of the light-emitting portion 3 adjacent to the transmission portion 2 toward one end of the light-emitting portion 3 facing away from the transmission portion 2.

In one embodiment, the left side in FIG. 2 is defined as the left side surface of the light-emitting portion 3. The right side in FIG. 2 is defined as the right side surface of the light-emitting portion 3. The left and right side surfaces of the light-emitting portion 3 are gradually converged toward the optical axis direction along the light transmission direction, so that light emitted from the light source 200 and emitted to the left and right side surfaces of the light-emitting portion 3 can be totally reflected. The totally reflected light is transmitted to the light-emitting convex surface 31 of the light-emitting portion 3 and then totally reflected, thereby preventing the light emitted from the light source 200 from being refracted by the light-emitting convex surface 31 and then reflected by the light-emitting portion 3. Since in such design, an incident angle of most of the light emitted from the light source to the side surfaces of the light-emitting portion is greater than a total reflection critical angle of the light-emitting portion 3, there is no refraction. For example, an optical path of the light incident on the light-emitting portion 3 is as follows. The light incident on the right side surface of the light-emitting portion 3 can be firstly totally reflected to the light-emitting convex surface 31 of the light-emitting portion 3, secondly totally reflected on the light-emitting convex surface 31 of the light-emitting portion 3 and reflected to the left side surface of the light-emitting portion 3, and thirdly totally reflected again to the right side surface of the transmission portion 2 on the left side surface of the light-emitting portion 3. The light incident on the left side surface of the light-emitting portion 3 can be firstly totally reflected to the light-emitting convex surface 31 of the light-emitting portion 3, secondly totally reflected to the right side surface of the light-emitting portion 3 on the light-emitting convex surface 31 of the light-emitting portion 3, and thirdly totally reflected again to the left side surface of the transmission portion 2 on the right side surface of the light-emitting portion 3. In this case, since all side surfaces of the transmission portion 2 are coated with the light absorbing black paint, the light totally reflected to the left and right side surfaces of the transmission portion 2 is stopped from being reflected. Thus, the light is hardly emitted out of the side surfaces of the transmission portion 2 and the side surfaces of the light-emitting portion 3, or reflected by the side surfaces of the automotive lamp optical element and then refracted out of the light-emitting convex surface 31 of the light-emitting portion 3, so that the stray light is substantially eliminated. FIG. 4 is a front view of an automotive lamp optical element.

To facilitate processing and manufacturing, the light-incident portion 1, the transmission portion 2 and the light-emitting portion 3 are integrally formed. In this embodiment, the light-incident portion 1, the transmission portion 2 and the light-emitting portion 3 are all made of transparent plastics, silica gel, or glass. These materials are transparent and have a good light propagation property. The commonly used plastics are polymethyl methacrylate (PMMA) or polycarbonate (PC).

The automotive lamp optical element provided by this embodiment is provided with the incident portion 1, the transmission portion 2 and the light-emitting portion 3 connected in sequence. The incident portion 1 is provided with at least one light-incident structure 11 configured to converge light. The area of the cross section of the transmission portion 2 gradually increases in the light transmission direction from one end of the transmission portion 2 adjacent to the light-incident portion 1 toward one end of the transmission portion 2 adjacent to the light-emitting portion 3, so that the light can be better transmitted and the whole automotive lamp optical element is small in size, thereby avoiding unnecessary structures. The light-emitting convex surface 31 is formed on one end of the light-emitting portion 3 facing away from the transmission portion 2, the light is converged by the light-incident structure 11, transmitted to the light-emitting portion 3 via the transmission portion 2, and finally reflected out of the light-emitting convex surface 31 and projected to form an automotive lamp light shape.

The automotive lamp optical element provided by this embodiment is simple in structure, small in size, easy to install, and has high optical system accuracy, low dimming difficulty, low cost, and no stray light.

Figure 5:
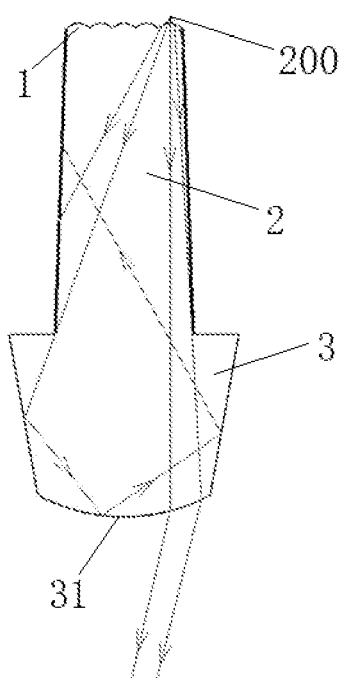
FIG. 5 is a top view of an automotive lamp module of an embodiment of the present application.

This embodiment also provides an automotive lamp module that functions to illuminate a front area of the vehicle so as to improve the driver's visibility. As shown in FIG. 5, the automotive lamp module includes the above automotive lamp optical element, and further includes at least one light source 200. The at least one light source 200 is disposed opposite to and in one-to-one correspondence with the at least one light-incident structure 11. Taking a leftmost light source 200 as an example, a first part of the light emitted by the leftmost light source 200 is directly emitted to the light-emitting convex surface 31 of the light-emitting portion 3, and is projected by the light-emitting convex surface 31 of the light-emitting portion 3 to form an automotive lamp light shape. A second part of the light emitted by the leftmost light source 200 is emitted to the side surfaces of the transmission portion 2 and is cut off by the side surfaces of the transmission portion 2 coated with the light absorbing black paint, and cannot be emitted out of or reflected by the side surfaces of the transmission portion 2. A third part of the light emitted by the leftmost light source 200 is emitted to the right side surface of the light-emitting portion 3, totally reflected to the light-emitting convex surface 31 of the light-emitting portion 3, totally reflected from the light-emitting convex surface 31 of the light-emitting portion 3 to the left side surface of the light-emitting portion 3, and then totally reflected from the left side surface of the light-emitting portion 3 to the right side surface of the transmission portion 2 and cut off.

In this embodiment, a single automotive lamp module is provided with five light sources 200, the automotive lamp provided with three of the above automotive lamp modules can form 15 illumination areas, that is, a matrix headlamp of the automotive has 15 pixels, which can realize the subdivision illumination of 15 areas. When a target object such as another vehicle or pedestrian appears in front of the vehicle, the light source 200 corresponding to the area is turned off, so that this area darkens, preventing other road users from dazzling. It is to be noted that the size of the above automotive lamp optical element is related to the number of light sources 200 of a single automotive lamp module. The less the number of light sources 200 is, the smaller the size of the automotive lamp optical element is. In this embodiment, an opening size of the light-emitting convex surface 31 of the light-emitting portion 3 is about 20 mm high and about 10 mm wide, which is much less than an opening size of a lens of the existing matrix headlamp module, so that the automotive lamp optical element can adapt to much richer and more diverse automotive lamp shapes. The light-incident structures 11 may also be arranged in multiple rows, and a single automotive lamp module can realize a matrix light shape with multiple rows. In this embodiment, only five light-incident structures 11 in a single row are schematically illustrated.

This embodiment also provides a vehicle. The vehicle includes the above automotive lamp module, which is easy to install and has high optical system accuracy, low dimming difficulty, low cost and no stray light.

The automotive lamp optical element, the automotive lamp module and the vehicle provided by this embodiment have advantages as follows.

(1) The size is small. The whole automotive lamp module only needs the light source 200 and one automotive lamp optical element. The automotive lamp optical element is highly compact and integrated and has a very small three-dimensional volume, and even equipped with corresponding accessories such as a radiator, a mounting bracket and the like, the whole automotive lamp module still has a very small size.

(2) The installation is simple. In addition to the light source 200, only one optical element is provided. Therefore, only the position accuracy between the optical element and the light source 200 needs to be ensured during the installation and no complicated optical system installation adjustment is needed, so that the installation process is simple.

(3) The structure is simple. For the component configuration, there is no need to set various complicated corresponding optical system accessories such as the mounting bracket for positioning and mounting the primary optical element and the secondary optical element, so that the structure of the automotive lamp module is simple.

(4) The optical system accuracy is high. Only one automotive lamp optical element needs to be provided, the structure of this automotive lamp optical element is also not complicated, and the manufacturing accuracy of this automotive lamp optical element is relatively easy to be ensured. Therefore, in a case where the manufacturing accuracy of this automotive lamp optical element meets the requirement, only the accuracy of the relative position between one automotive lamp optical element and the light source 200 needs to be ensured when the automotive lamp optical element is assembled, and the accuracy of the relative positions between multiple automotive lamp optical elements and the light source 200 does not need to be satisfied, so that the optical system accuracy is high.

(5) The dimming difficulty is low. It is only necessary to ensure the accuracy of the relative position between one automotive lamp optical element and the light source 200. Compared with the optical system requiring more dimming designs in the existing art, the automotive lamp optical element provided by this embodiment reduces the dimming difficulty.

(6) The cost is low. This automotive lamp module has a simple structure and a small number, so that both manufacturing and processing costs are low.

(7) There is no stray light. The transmission portion 2 is coated with non-glare black paint, such as matte black paint, and the left and right side surfaces of the light-emitting portion 3 and the light-emitting convex surface 31 are configured as total reflection surfaces so that the light cannot be emitted out of the side surfaces of this optical element or emitted after being reflected by the side surfaces, so that substantially no stray light is generated, thereby ensuring the quality of the automotive lamp light shape. Moreover, on the one hand, such arrangement reduces the size of the transmission portion 2, so that the size of the automotive lam optical element is further reduced; and on the other hand, since the side surfaces of the light-emitting portion 3 are not coated with the black paint, permeability and aesthetics of the part of the automotive lamp optical element exposed outside are ensured.

The invention claimed is:

1. An automotive lamp optical element, comprising:
a light-incident portion;
a transmission portion; and
a light-emitting portion connected in sequence, wherein:
the light-incident portion is provided with at least one light-incident structure configured to converge light;
an area of a cross section of the transmission portion gradually increases in a light transmission direction, wherein each of four side surfaces of the transmission portion except two end surfaces of the transmission portion is a flared trapezoid in the light transmission direction, and every two opposite side surfaces of the four side surfaces of the transmission portion have a same shape, wherein the cross section of the transmission portion is a cross section perpendicular to an optical axis direction;
a light-emitting convex surface is formed on one end of the light-emitting portion facing away from the transmission portion;
a width W1 of the transmission portion is less than a width W2 of the light-emitting portion, the side surfaces of the transmission portion each are coated with a light absorbing layer, left and right side surfaces of the light-emitting portion are gradually converged toward the optical axis direction in the light transmission direction, so that an incident angle of the converging light emitted from the light-incident portion to the left and right side surfaces of the light-emitting portion is greater than a total reflection critical angle of the light-emitting portion, and the light reflected totally from the left and right side surfaces of the light-emitting portion is transmitted to the light-emitting convex surface and then totally reflected.

2. The automotive lamp optical element of claim 1, wherein a light-incident convex surface is formed on one end of the light-incident structure facing away from the transmission portion.

3. The automotive lamp optical element of claim 1, wherein the light-incident structure comprises at least one converging cup.

4. The automotive lamp optical element of claim 1, wherein a height H1 of the transmission portion is less than a height H2 of the light-emitting portion.

5. The automotive lamp optical element of claim 4, wherein an area of a cross section of the light-emitting portion gradually decreases in the light transmission direction.

6. The automotive lamp optical element of claim 1, wherein a plurality of light-incident structures are provided and distributed in rows and columns.

7. The automotive lamp optical element of claim 1, wherein the light-incident portion, the transmission portion and the light-emitting portion are integrally formed.

8. An automotive lamp module, comprising:
an automotive lamp optical element and at least one light source, the automotive lamp optical element includes a light-incident portion, a transmission portion and a light-emitting portion connected in sequence;
wherein the light-incident portion is provided with at least one light-incident structure configured to converge light;
wherein an area of a cross section of the transmission portion gradually increases in a light transmission direction, wherein each of four side surfaces of the transmission portion except two end surfaces of the transmission portion is a flared trapezoid in the light transmission direction, and every two opposite side surfaces of the four side surfaces of the transmission portion have a same shape, wherein the cross section of the transmission portion is a cross section perpendicular to an optical axis direction;
wherein a light-emitting convex surface is formed on one end of the light-emitting portion facing away from the transmission portion;
wherein the at least one light source is disposed opposite to and in one-to-one correspondence with the at least one light-incident structure; and wherein a width W1 of the transmission portion is less than a width W2 of the light-emitting portion, the side surfaces of the transmission portion each are coated with a light absorbing layer, left and right side surfaces of the light-emitting portion are gradually converged toward the optical axis direction in the light transmission direction, so that an incident angle of the converging light emitted from the light-incident portion to the left and right side surfaces of the light-emitting portion is greater than a total reflection critical angle of the light-emitting portion, and the light reflected totally from the left and right side surfaces of the light-emitting portion is transmitted to the light-emitting convex surface and then totally reflected.

9. A vehicle, comprising:
an automotive lamp module including an automotive lamp optical element and at least one light source, the automotive lamp optical element includes a light-incident portion, a transmission portion and a light-emitting portion connected in sequence;
wherein the light-incident portion is provided with at least one light-incident structure configured to converge light;
wherein an area of a cross section of the transmission portion gradually increases in a light transmission direction, wherein each of four side surfaces of the transmission portion except two end surfaces of the transmission portion is a flared trapezoid in the light transmission direction, and every two opposite side surfaces of the four side surfaces of the transmission portion have a same shape, wherein the cross section of the transmission portion is a cross section perpendicular to an optical axis direction;
wherein a light-emitting convex surface is formed on one end of the light-emitting portion facing away from the transmission portion;
wherein the at least one light source is disposed opposite to and in one-to-one correspondence with the at least one light-incident structure; and
wherein a width W1 of the transmission portion is less than a width W2 of the light-emitting portion, the side surfaces of the transmission portion each are coated with a light absorbing layer, left and right side surfaces of the light-emitting portion are gradually converged toward the optical axis direction in the light transmission direction, so that an incident angle of the converging light emitted from the light-incident portion to the left and right side surfaces of the light-emitting portion is greater than a total reflection critical angle of the light-emitting portion, and the light reflected totally from the left and right side surfaces of the light-emitting portion is transmitted to the light-emitting convex surface and then totally reflected.

10. The automotive lamp optical element of claim 2, wherein a height H1 of the transmission portion is less than a height H2 of the light-emitting portion.

11. The automotive lamp optical element of claim 3, wherein a height H1 of the transmission portion is less than a height H2 of the light-emitting portion.

12. The automotive lamp optical element of claim 2, wherein a plurality of light-incident structures are provided and distributed in columns.

13. The automotive lamp optical element of claim 3, wherein a plurality of light-incident structures are provided and distributed in columns.

14. The automotive lamp module of claim 8, wherein a light-incident convex surface is formed on one end of the light-incident structure facing away from the transmission portion.

15. The automotive lamp module of claim 8, wherein the light-incident structure comprises at least one converging cup.

* * * * *